United States Patent [19]
Itoh

[11] Patent Number: 5,687,002
[45] Date of Patent: Nov. 11, 1997

[54] IMAGE FORMING APPARATUS WITH A SOLID-STATE SCANNING OPTICAL PRINT HEAD

[75] Inventor: Tetsuya Itoh, Okazaki, Japan

[73] Assignee: Minolta Co., Ltd., Osaka, Japan

[21] Appl. No.: 505,487

[22] Filed: Jul. 21, 1995

[30] Foreign Application Priority Data

Jul. 22, 1994 [JP] Japan ................... 6-191805

[51] Int. Cl.$^6$ ............... H01N 1/407; H01N 1/36
[52] U.S. Cl. ............... 358/298; 347/131; 347/253
[58] Field of Search ............... 358/298; 347/137, 347/251, 253, 133, 237, 238

[56] References Cited

U.S. PATENT DOCUMENTS

| | | | |
|---|---|---|---|
| 4,864,419 | 9/1989 | Saito et al. | 358/300 |
| 4,952,949 | 8/1990 | Uebbing | 346/154 |
| 5,194,878 | 3/1993 | Murakami et al. | 346/108 |
| 5,206,686 | 4/1993 | Fukui et al. | 355/208 |
| 5,325,228 | 6/1994 | Matsubara et al. | 359/249 |

FOREIGN PATENT DOCUMENTS 63-189268  8/1988  Japan.

*Primary Examiner*—Peter S. Wong
*Assistant Examiner*—Gregory J. Toatley
*Attorney, Agent, or Firm*—Sidley & Austin

[57] ABSTRACT

An image forming apparatus with a solid-state scanning optical print head reproduces tones by an intensity modulation method, corrects light dispersion of each element by a pulse modulation method, and corrects fluctuations in sensitivity characteristics of a photosensitive member by switching the drive current value of maximum light exposure.

5 Claims, 7 Drawing Sheets

F I G. 4
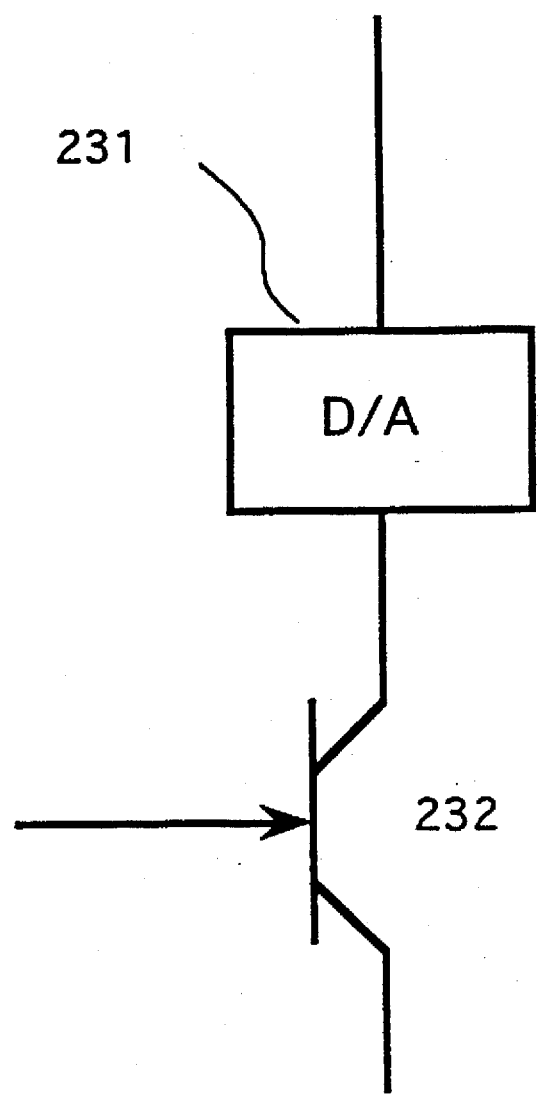

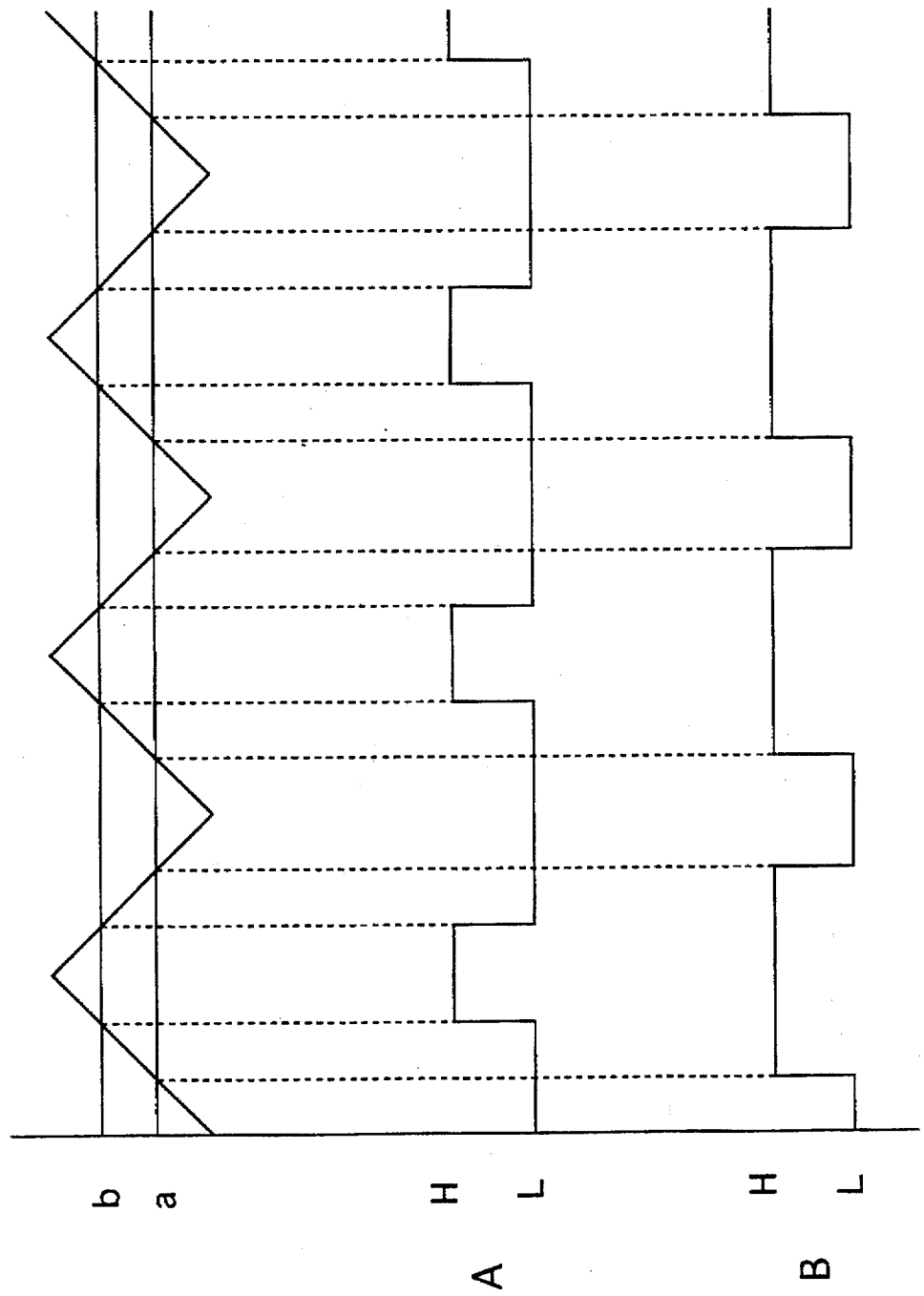
F I G. 5

IMAGE FORMING APPARATUS WITH A SOLID-STATE SCANNING OPTICAL PRINT HEAD

BACKGROUND OF THE INVENTION

1. Field of the Invention

The present invention relates to an image forming apparatus (digital copy machine, printer and the like) provided with a solid-state scanning type optical print head (LED array, PLZT array, phosphor dot array, EL array and the like).

2. Description of the Related Art

A pulse-width modulation type apparatus was reported in the Spring 1989 Proceedings of the Institute of Electronics, Information and Communication Engineers (IEICE) National Conference D-193 (High-speed LED Head Driving Methods). This apparatus controls modulation and corrects light dispersion of each element by generating binary data based on drive current data set for each element and modulation data of each element to correct the light dispersion of each element of the LED head, and controlling the ON/OFF switching of the drive current of each element of the LED head in accordance with said binary data. This apparatus controls the drive current output (maximum amount of light) by controlling a gate voltage in accordance with printing speed so as to ensure exposure suitable for the printing speed.

A pulse-width modulation type apparatus was reported in the Spring 1991 Proceedings of the Institute of Electronics, Information and Communication Engineers (IEICE) National Conference D-385 (LED Head Pulse Width Modulation Tone Method Studies). This apparatus controls tone and corrects light dispersion (and gamma correction) of each element by generating 6-bit data by light correction calculation on 4-bit tone data (i.e., correction to eliminate light dispersion of each element of the LED head as well as gamma correction), controlling ON/OFF switching of the drive current of each element of the LED head in accordance with binary data generated based on said 6-bit data. In this apparatus, the timing for light emission is controlled so as to achieve synchronous timing of each tone by using up/down counters.

U.S. Pat. No. 4,864,419 discloses an apparatus which compares tone data, subjected to digital-to-analog (D/A) conversion, to a triangular waveform of predetermined periodicity, generates binary data of a pulse width corresponding to the tone, and controls the ON/OFF switching of a predetermined output laser diode in accordance with said binary data. That is, the aforesaid publication discloses a method (pulse width modulation method) for tone control via laser emission time. Furthermore, this publication discloses a construction for optically exposing a photosensitive member charged by a charging current of a predetermined value by means of laser diodes driven by a drive current of a predetermined value, wherein the charging current of the photosensitive member and the value of the drive current of the laser diodes are regulated based on the detection of the surface potential (decay potential) of optically exposed part.

U.S. Pat. No. 5,206,686 discloses an apparatus which ensures fidelity in image reproduction regardless of the amount of fluctuation in physical properties, wherein tone is controlled by changing the light output intensity for each data unit and the amount of physical influence (e.g., surface temperature of photosensitive member) on the sensitivity characteristics of the photosensitive member (e.g., characteristics representing decay potential relative to amount of exposure) is detected by changing the value of the drive current to the laser diode in accordance with tone data, and Switching the maximum light drive current value (drive current value for FF when tones are 256 shades designated 00–FF) in accordance with said detection result.

In order to achieve acceptable tone reproduction with a solid-state scanning optical print head, the amount of light dispersion by each element must be corrected and fluctuation in sensitivity characteristics of the photosensitive member must be compensated.

In the device described in the previously mentioned publication D-193, correction data and tone data are latched, and the ON/OFF switching of the drive current is controlled in accordance with both latched outputs. In the apparatus described in the previously mentioned publication D-385, ON/OFF control data are generated from the correction data and the tone data, and ON/OFF switching of the drive current is controlled in accordance with said ON/OFF control data. Accordingly, circuit construction is complicated in the apparatus of publication D-193, and data processing is complicated in the apparatus of publication D385. Thus, inherent disadvantages of these apparatus include increased cost and reduced processing speed.

SUMMARY OF THE INVENTION

A main object of the present invention is to provide an apparatus capable of excellent tone reproduction without complex circuit construction or data processing.

Another object of the present invention is to provide an apparatus capable of excellent tone reproduction regardless of fluctuations in sensitivity characteristics of the photosensitive member.

In order to accomplish the aforesaid objects, the present invention provides an apparatus for forming images by exposing the surface of a photosensitive member by light outputted from various elements of an optical print head, said apparatus comprising means for respectively generating drive signals for each element by digital-to-analog conversion of individual tone data specifying the amount of exposure for each said element, means for respectively generating control signals specifying the light emission time period of each element based on correction data for unifying light output characteristics of each said element, means for respectively outputting drive current for each element by effectualizing the drive signals of each said element for a time period specified by the control signal of each said element, means for detecting an amount of physical influence on photosensitivity characteristics of the photosensitive member, and means for setting an amplitude of said drive current in accordance with the detected amount of physical influence.

The present invention reproduces tones by an intensity modulation method, corrects light dispersion of each element by a pulse modulation method, and corrects fluctuations in sensitivity characteristics of a photosensitive member by switching the drive current value of maximum light exposure.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 4 is a circuit diagram showing details of the drive circuit of FIG. 3;

FIG. 5 is an illustration showing signal input to the comparator of FIG. 3;

DETAILED DESCRIPTION OF THE PREFERRED EMBODIMENTS

Figure 1:
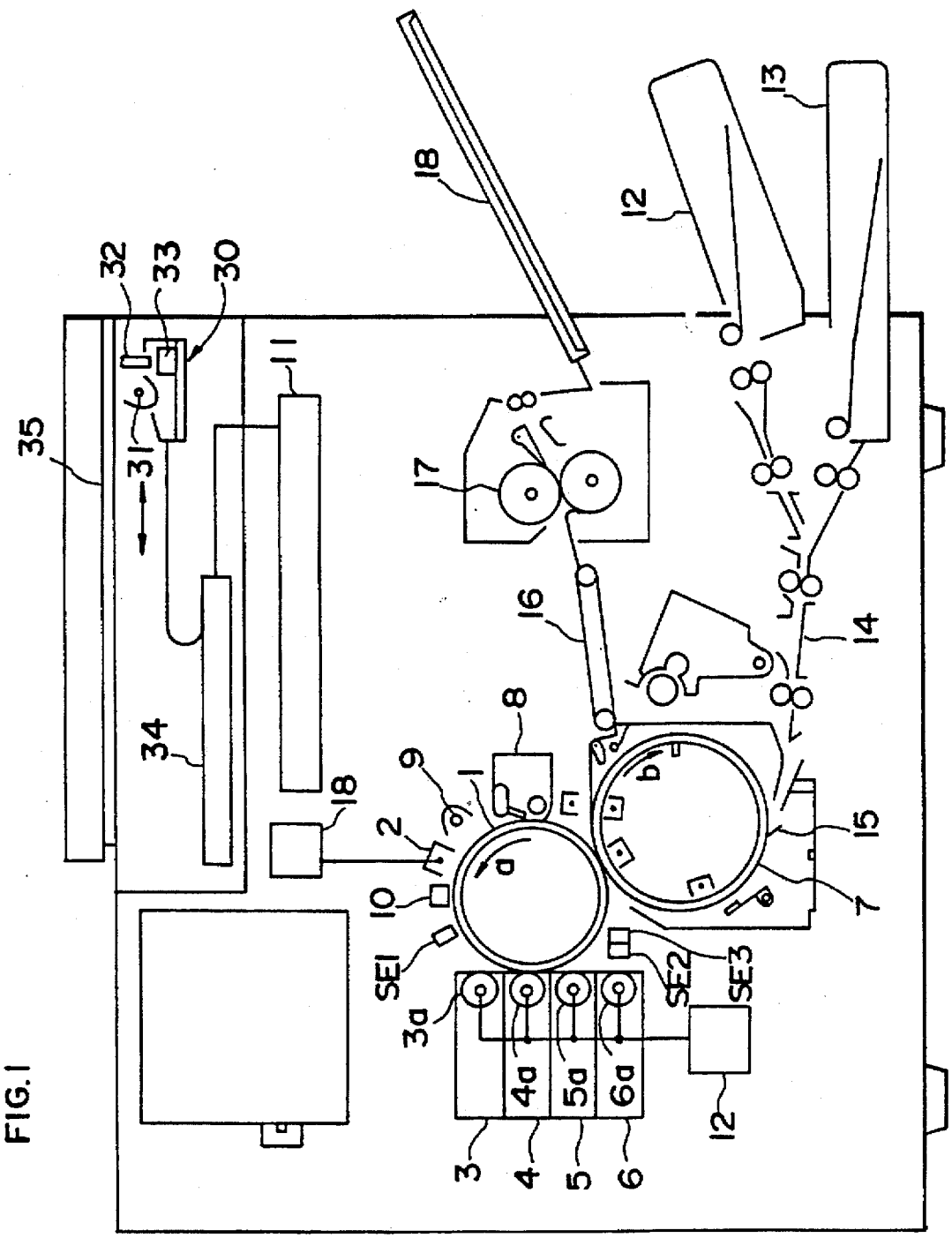
FIG. 1 is a diagrammatic illustration of the construction of a digital color copy machine utilizing the present invention.
Figure 2:
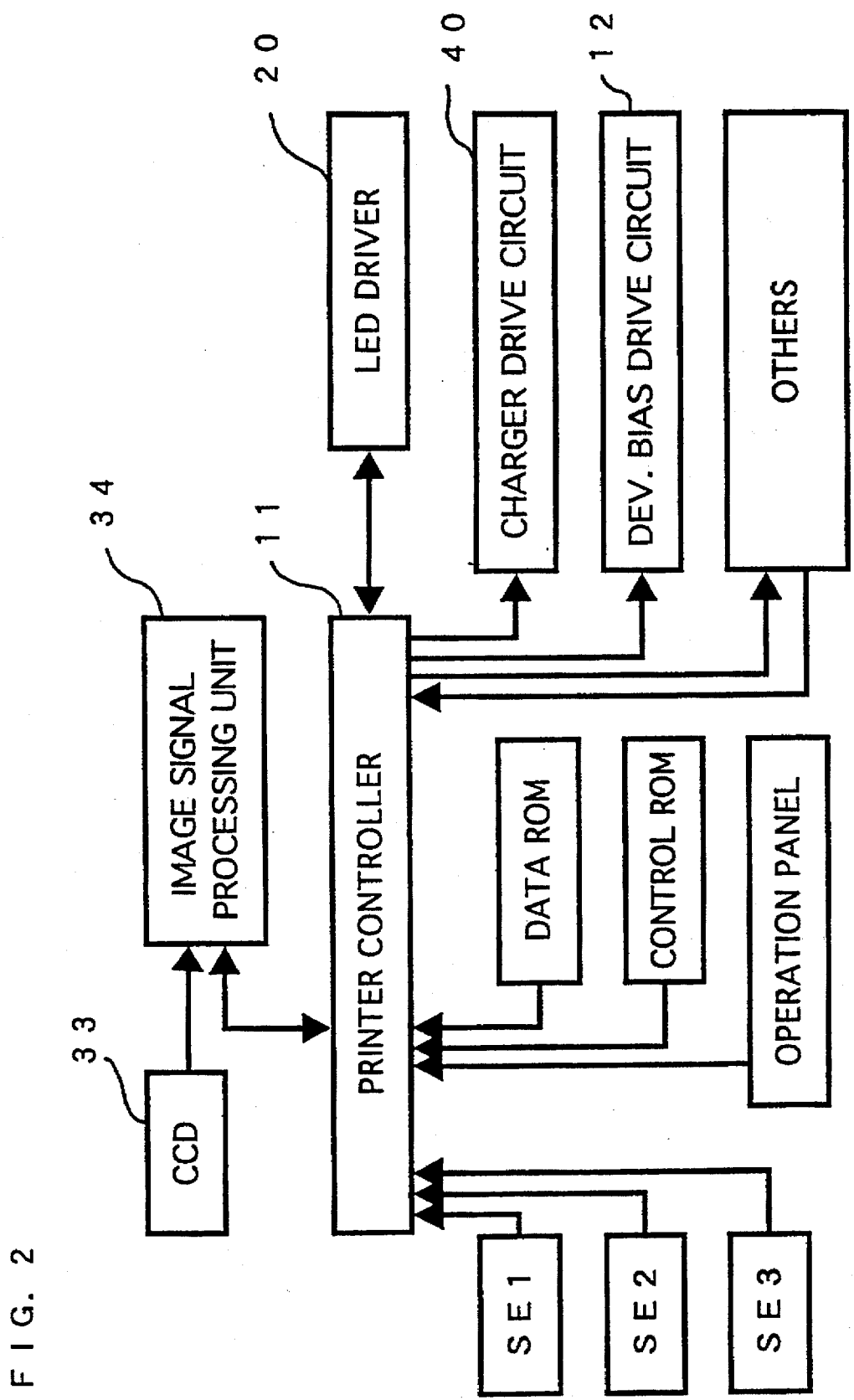
FIG. 2 is a block diagram showing the control circuit of the apparatus of FIG. 1.

The preferred embodiment of the image forming apparatus of the present invention is described hereinafter with reference to the accompanying drawings. This embodiment shows the present invention adapted to a copy machine which forms full color images by outputting a document image read by an image reader using an LED head. FIG. 1 shows the construction of a digital color copy machine utilizing the present invention. FIG. 2 is a block diagram showing the control circuit of the apparatus of FIG. 1.

In FIG. 1, photosensitive drum 1 is provided so as to be rotatably driven in the arrow a direction. Arranged sequentially around the periphery of photosensitive drum 1 are charger 2, developing devices 3, 4, 5, and 6 of a magnetic brush type and disposed in four levels so as to be vertically movable, transfer drum 7, cleaning device 8, and eraser lamp 9.

Image reader unit 30 comprises exposure lamp 31, lens array 32, charge-coupled-device (CCD) line sensor 33 and the like, and is provided with image signal processing unit 34. A document placed on glass document platen 35 is sequentially read as signals of the three primary colors R (red), G (green), and B (blue) by line sensor 33 by moving unit 30 leftwardly in FIG. 1. These R, G, B color signals are converted to four signal types Y (yellow), M (magenta), C (cyan), and Bk (black) by image signal processing unit 34. Specifically, image signals read by CCD line sensor 33 undergo analog-to-digital (A/D) conversion by image signal processing unit 34, and are then subjected to well-known processing such as shading correction, log conversion, under color removal/black addition, masking, density correction, spatial frequency correction and the like to generate image data, and said image data are then transmitted to printer controller 11 for gamma correction (hereinafter, gamma corrected multi-level image data are referred to as "tone data" and the data used for gamma correction are stored in data ROM (read only memory)), and after gamma correction is completed, the multi-level tone data are transmitted to LED driver 20 (FIG. 2) to drive LED head 10.

LED head 10 is provided with a plurality of LEDs arranged parallel to the axial direction of photosensitive drum 1. The lighted state of each LED is controlled by LED driver 20, so as to form electrostatic latent images of each color on the surface of photosensitive drum 1.

Developing devices 3, 4, 5, and 6 accommodate developers containing toners of each color yellow, magenta, cyan, and black sequentially from the uppermost level. A developing device 3, 4, 5, and 6 corresponding to the color of the electrostatic latent image formed is variously disposed at a developing position confronting photosensitive drum 1 to develop said latent image. A developing bias from developing bias drive circuit 12 is applied to developing sleeves 3a, 4a, 5a, and 6a of developing devices 3, 4, 5, and 6, respectively, and the value of said developing bias is variably set by printer controller 11.

On the other hand, copy sheets are fed one sheet at a time from either of automatic paper supply cassettes 12 and 13. A fed copy sheet passes through transport path 14, comprising pairs of rollers and guide panels, so as to be delivered to the previously mentioned transfer drum 7. The leading edge of the copy sheet is chocked to transfer drum 7 by hook 15, and said copy sheet is wrapped around the surface of said transfer drum 7. Transfer drum 7 is rotated in the arrow b direction synchronously with the surface of photosensitive drum 1, and the toner image of each color is transferred onto the copy sheet.

That is, a total of four processes, i.e., charging, exposure, developing, and transfer processes, are executed for each color. When transfers of all toner images are completed, the copy sheet is separated from transfer drum 7, and transported to fixing device 17 via conveyor belt 16. After the toner image is fixed, the copy sheet is discharged to discharge tray 18.

In addition to the previously mentioned devices, other devices also arranged around the periphery of photosensitive drum 1 are potential sensor SE1 for measuring the surface potential of photosensitive drum 1 charged by charger 2, and sensors SE2 and SE3 for measuring temperature and humidity in the vicinity of photosensitive drum 1; the output of these sensors are inputted to printer controller 11, as shown in FIG. 2. Printer controller 11 is connected to a data ROM 50 in which is stored the data necessary for calculating a suitable amount of exposure based on the values output from temperature sensor SE2 and humidity sensor SE3, a control ROM 55 in which is stored the programs necessary for the aforesaid calculation and programs for controlling the entire copy machine, an operation panel 60 provided with copy number setting keys and print switch and the like, developing bias drive circuit 12 for applying developing biases to developing devices 3, 4, 5, and 6, and charger drive circuit 40 for adjusting the output of charger 2, and the like.

LED driver 20 is described hereinafter.

Figure 3:
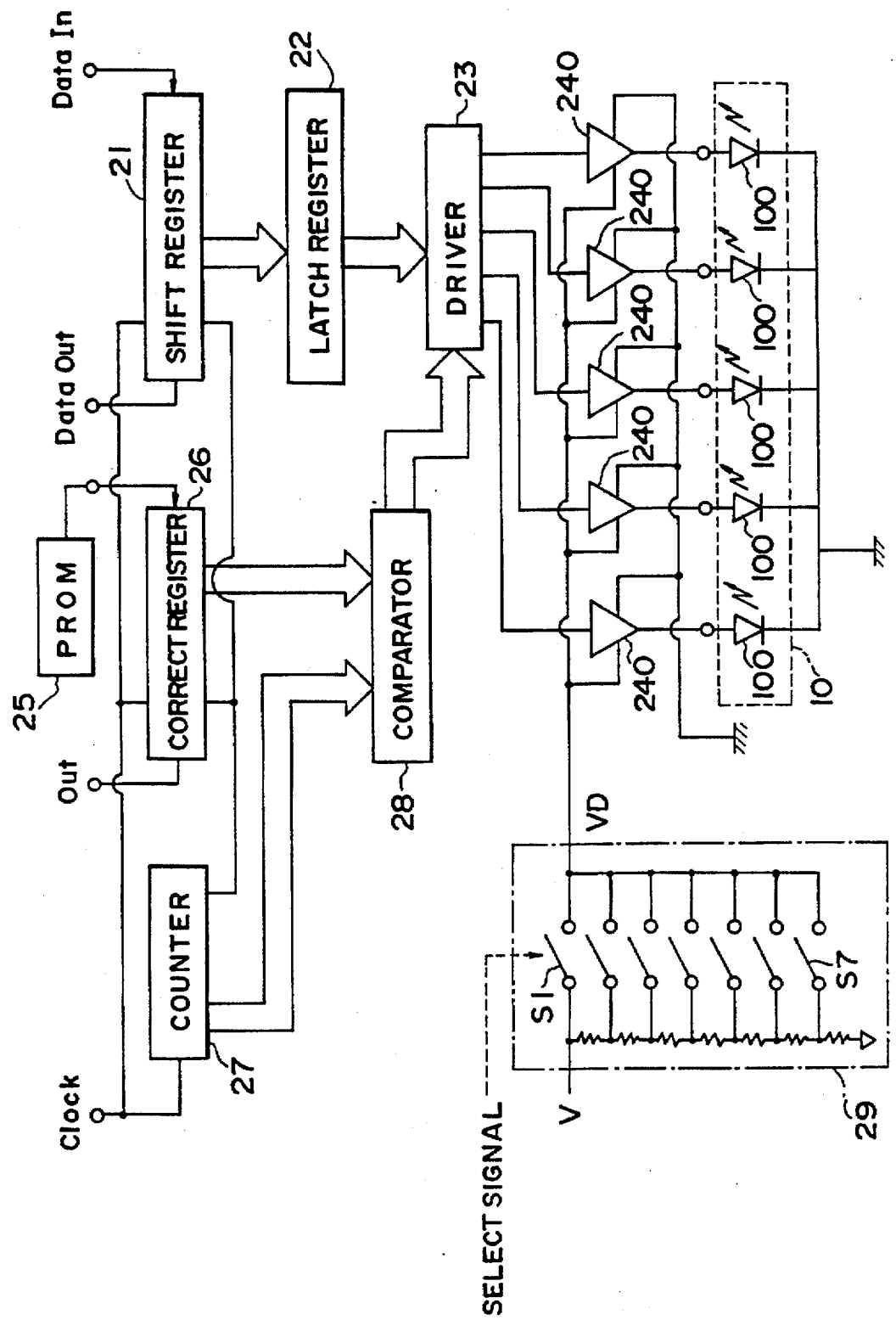
FIG. 3 shows part of the LED head drive circuit in an embodiment of the invention.

FIG. 3 shows the integrated circuit comprising the driver circuit for processing tone data of 128 picture elements (128 individual LED elements). When, for example, printing an A4 size page at 400 dpi, 3,300 picture elements are required. Thus, LED driver 20 of the present embodiment is the integrated circuit shown in FIG. 3 provided with 26 separate parallel rows of 128 picture elements each.

The tone data of each picture element (in the present case, 256 levels of 00~FF) transmitted from printer controller 11 to LED driver 20 are sequentially synchronized by clock signals and fetched to shift register 21. The tone data of each picture element fetched to shift register 21 are synchronized by a horizontal synchronization signal (a signal generated every 128 counts by the counter) from counter 27, and transferred to latch register 22. In latch register 22, the transferred tone data of each picture element is held until the next data are transferred, whereupon the held data are outputted to driver 23.

Driver 23 comprises D/A converter 231 and transistor 232 connected in series. A D/A converter 231 and a transistor 232 are provided in each of 128 groups corresponding to each picture element.

Multi-level tone data for each picture element output from latch register 22 are respectively converted to analog signals by D/A converter 231, which are then transmitted to amplifier 240 as drive signals for each LED element 100. These drive signals are outputted to amplifiers 240 only when transistor 232 for each said picture element is opened by a signal (i.e., a binary signal having a pulse width equivalent to the correction data) from comparator 28. That is, the aforesaid drive signals are output to amplifier 240 of the respective picture element only for a time set by said picture element correction data for a drive current of a value corresponding to the picture element tone data.

That is, the process described below is accomplished by comparator 28.

Correction data for each LED element 100 stored in PROM (programmable read only memory) 25 are synchronized with clock signals and fetched to sequential correction register. Correction data are preset for each LED element 100; when the respective LED elements 100 are driven by the same tone data, the light output intensity of each LED element 100 is corrected so that they are identical. When fetched correction data arrive at a 128 picture element segment and a horizontal synchronization signal is transmitted from counter 27, correction data for each picture element are outputted in parallel, subjected to D/A conversion, and thereafter are inputted as correction signals to input pins of said picture elements of comparator 28.

On the other hand, a triangular wave from counter 27 is input to each inputted pin on the other side of comparator 28. Thus, the aforesaid correction signal is compared to said triangular wave, with the result that a [1] is outputted when the correction signal is larger than the triangular wave, and a [0] is outputted when the correction signal is smaller than the triangular wave, so as to generate a binary signal having a pulse width equivalent to the level of the correction signal.

FIG. 5 shows the relationship between the input triangular wave and the correction signal. When correction signal a is inputted, binary signal A is outputted from comparator 28. When a correction signal b is inputted which has a level greater than correction signal a, a binary signal B is outputted which has a width greater than binary signal A. Accordingly, a binary signal having a pulse width equivalent to the level of the correction signal of each picture element is inputted to the base of each transistor 232 of each picture element, such that a drive signal is outputted from latch register 22 to amplifiers 24 only during the time said pulse is inputted. That is, as previously described, a drive current having a value equivalent to the tone data of each picture element is respectively outputted only for the time set by the correction data of said picture element. From another perspective, a current value equivalent to the tone data of individual picture elements is respectively outputted as a drive current corrected by the correction data of said picture element.

The drive current outputted from each transistor 232 is amplified by a predetermined amplification factor by the amplifier 240 of each picture element, and supplied to the respective LED element 100. The predetermined amplification factor of each amplifier 240 is selectively settable in seven levels by opening one or more switches S1~S7 of selection unit 29 in accordance with selection signal from printer control unit 11. These selection signals are controlled in accordance with environmental fluctuations of temperature and humidity and the like.

Figure 6:
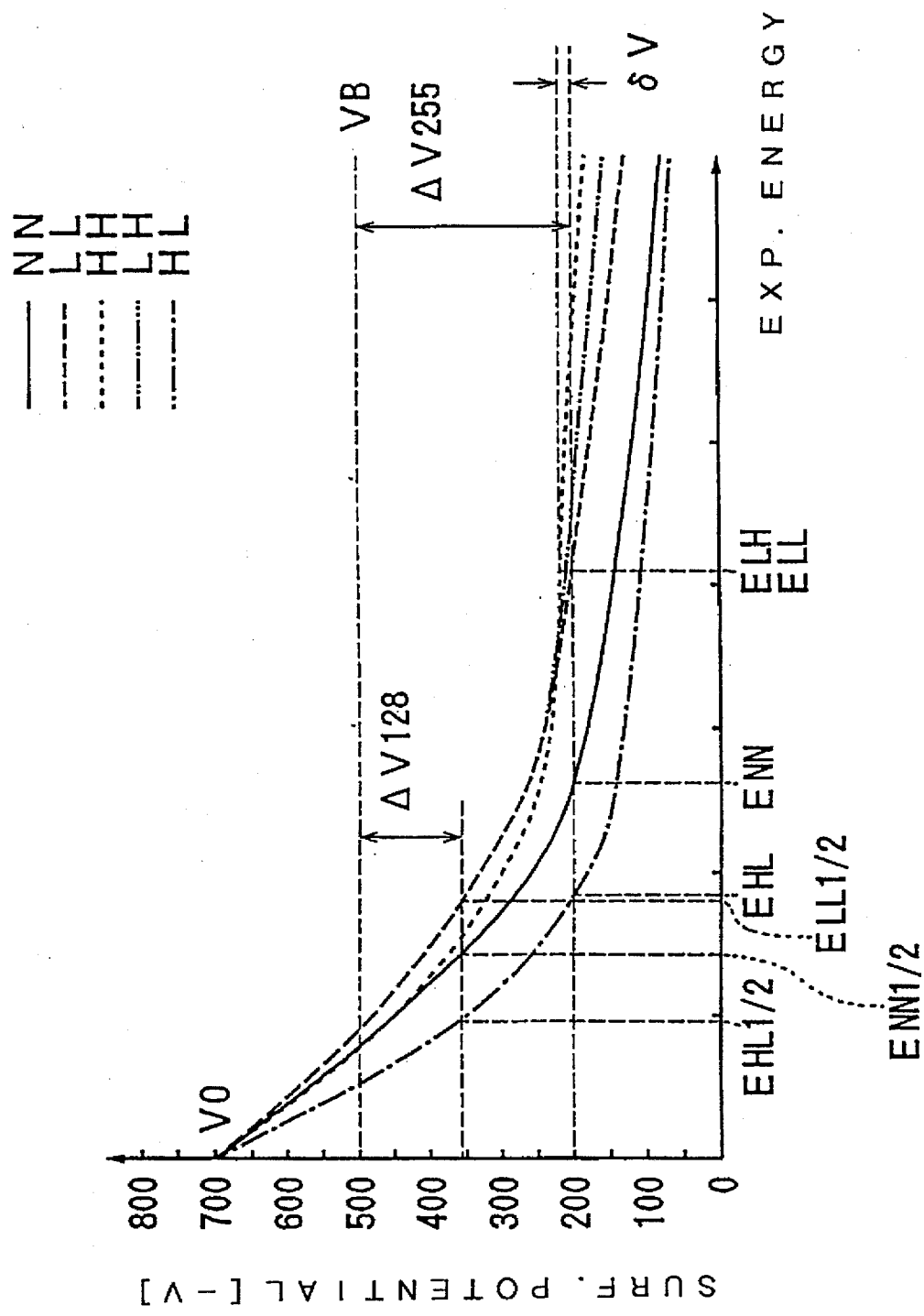
FIG. 6 is a graph showing photosensitivity characteristics of a photosensitive member.

FIG. 6 is a graph showing decay characteristics of the electric potential of the surface of the photosensitive member when said photosensitive member surface has been uniformly charged and exposed unified light exposure. Photosensitive member decay characteristics are changed by temperature and humidity. For example, when the developing potential difference required to obtain maximum density (densest tone density among 256 tones) is designated V255 (VB-V255), developing potential difference V255 can be obtained by exposure amount EEN if temperature and humidity are at standard condition (NN). However, under conditions of high temperature and low humidity (HL), maximum density can be obtained by exposure amount EHL which is less than exposure amount ENN (EHL<ENN), and under conditions of low temperature and low humidity (LL), maximum density is obtained by exposure amount ELL which is greater than exposure amount ENN (ENN<ELL). This relationship is similar to developing potential difference V128 corresponding to intermediate density.

Thus, in order to reproduce a document image with fidelity, the exposure amount must be changed in accordance with fluctuations in temperature and humidity in the vicinity of the surface of the photosensitive member. In the present apparatus, the exposure amount at maximum density (FF when tone data are 256 shades of 00~FF), can be suitably switched in accordance with temperature and humidity. That is, the maximum value of the drive current corresponding to tone data FF is suitably selected by switching the amplification factor of the drive current via selection of one or more of switches S1~S7 in accordance with temperature and humidity.

Since adjustment of the exposure amount alone is insufficient under environmental conditions of high temperature and high humidity, the exposure amount is switched to ELL (ELH), and relative to the inadequate potential difference δ V the developing bias VB, for example, is increased by δ V. Alternatively, rather than increasing developing potential VB, the charging potential V0 of the photosensitive member may be adjusted.

Figure 7:
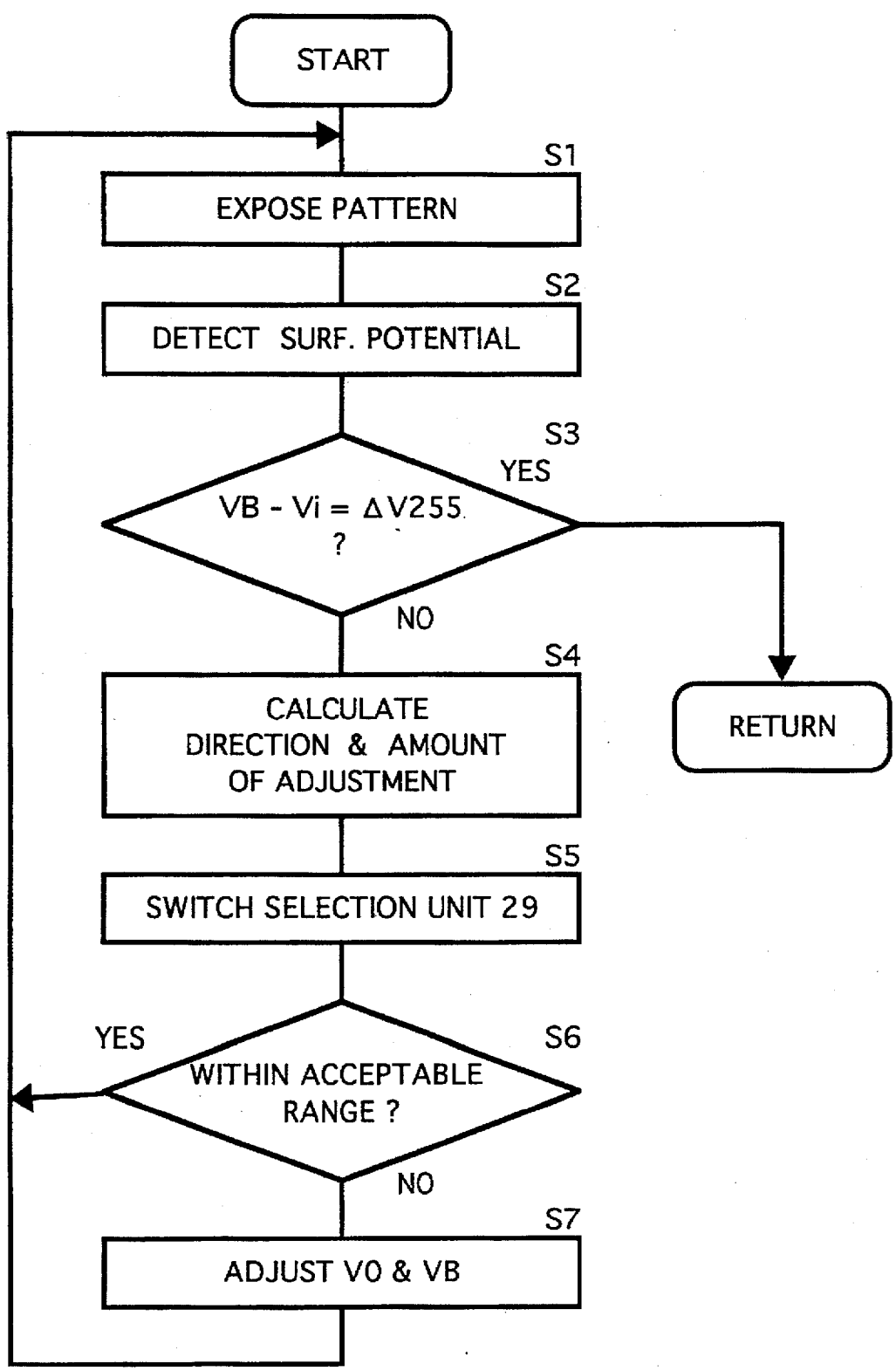
FIG. 7 is a flow chart showing the process for switching the amplification factor of the LED drive current in accordance with photosensitivity characteristics of the photosensitive member in the embodiment.

The processing sequence of the present embodiment is described hereinafter with reference to the flow chart of FIG. 7. This processing is executed prior to the image forming operation and before a predetermined time elapses.

The charged surface of photosensitive drum 1 is exposed by maximum exposure ENN (tone data=FF, and the selection switch for selecting voltage VD to set the amplification factor for amplifiers 240 is set to the initial state (e.g., intermediate switch S4)) when temperature and humidity are standard condition, so as to form a standard pattern latent image (step S1). The charge potential VO of photosensitive drum 1 and the developing potential VB of the developing sleeve are set at standard values.

Then, the decay potential Vi of the aforesaid standard pattern latent image is detected by surface potential sensor SE1 (step S2). As a result, when the potential difference between developing potential VB and decay potential Vi is within a range regarded as equal to developing potential difference V255 corresponding to a desired maximum density (step S3: YES), the routine directly returns inasmuch as suitable density can be realized under the present conditions.

On the other hand, when the potential difference between developing potential VB and decay potential Vi exceeds the range regarded as equal to developing potential difference V255 so as to be at variance therewith (step S3: NO), the direction of adjustment of exposure energy and the adjustment amount are calculated based on the detection results of temperature sensor SE2 and humidity sensor SE3 (step S4). That is, the amount of increase or decrease in the amplification factor necessary to suitably increase or decrease the amount of exposure energy is calculated, and the switches of selection unit 29 are switched based on said calculation result (step S5).

In step S6, a check is made to determine whether or not the difference between the potential difference of developing potential VB and decay potential Vi and the developing potential difference V255 corresponds to changes in the amplification factor of the drive current, i.e., a check is made to determine whether or not fluctuation in sensitivity characteristics of photosensitive drum 1 can be compensated by selecting the switches of selector unit 29 alone. When the result of the determination is positive (step S6: YES), the routine returns to step S1, and the aforesaid test is executed again.

When, however, it is determined that the difference between the potential difference between developing potential VB and decay potential Vi and the developing potential difference V255 is greater than can be resolved by switching the amplification factor of the drive current, i.e., when the potential difference between developing potential VB and decay potential Vi is not within a range regarded as equal to developing potential difference V255 (step S6: NO) regardless of switching the switches of selection unit 20 to S1 or S7, commands for adjusting the grid potential of charger 2 used to charge photosensitive drum 1 and/or the potential of developing sleeves of developing devices 3, 4, 5, 6 are outputted to charger drive circuit 40 and/or developing bias drive circuit 12 (step S7). Thereafter, the routine returns to step S1, and the aforesaid test is executed again.

Specifically, in one cycle of the flow chart, the developing bias VB changes a predetermined amount, and when a YES result is not obtained in step S3 a second cycle commences and the charging potential V0 is changed a predetermined amount. When the potential difference between developing potential VB and decay potential Vi is less than the developing potential difference V255 in the state selected by switch S1 of selection unit 29, developing potential V0 is decreased and developing bias VB is increased. On the other hand, when the potential difference between developing potential VB and decay potential Vi is greater than the developing potential difference V255 in the state selected by switch S7 of selection unit 29, developing potential V0 is increased and developing bias VB is decreased.

Thus, correction is accomplished for environmental conditions.

In the previously described embodiment, the drive signal of each element is generated from tone data by an intensity modulation method, and said drive signals are pulse width modulated by correction data and transmitted to each element as a drive current without controlling the ON/OFF switching of the drive current of each element based on correction data and toner data. Thus, excellent tone reproduction can be accomplished without complex circuit construction or complex data calculation processes. The amplification factor of the aforesaid drive current can be suitably selected in accordance with fluctuations in the amount of physical influence on sensitivity characteristics of the photosensitive member, such that a suitable exposure amount may be normally maintained.

In the present embodiment, the invention as been described in terms of a digital color copy machine provided with an LED array. That is, said description has been in terms of a digital copy machine provided with a means (shift register, latch register, driver D/A converter) for generating drive signals for each LED element by D/A conversion of tone data after gamma conversion specifying the exposure amount for each LED element of the LED print head, a means (PROM, correction register, counter, comparator) for generating pulse width signals specifying the light emission time of each LED element based on correction data to unify the light emission characteristics of the various LED elements, an outputted register for outputting drive current for each LED element for the time specified by the pulse width signal of said LED element by a drive signal of each said LED element, sensors for detecting temperature and humidity as physical factors influencing the sensitivity characteristics of the photosensitive member, and a means (correction process for environmental conditions executed in the control unit, selection unit) for selecting the amplification factor of said drive current in accordance with the detected temperature and humidity.

The present invention is not limited to LED arrays and digital color copy machines, and may be similarly adapted to solid-state scanning type optical print heads such as liquid crystal arrays, PLZT arrays, phosphor dot arrays, EL arrays and the like. That is, drive signals (current signals or voltage signals) may be generated based on gamma-corrected tone data, said drive signals may be corrected by pulse width signals generated based on dispersion correction data of each element, so as to obtain a drive current (or drive voltage) corresponding to fluctuations in sensitivity characteristics of a photosensitive member by selecting an amplification factor for the corrected signal in accordance with environmental conditions. Furthermore, the object of the optical print head may be a printer or facsimile.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for forming images by exposing a surface of a photosensitive member, said apparatus comprising:
   an optical print head having a plurality of elements for exposing the surface of the photosensitive member;
   means for respectively generating drive signals for each element by digital-to-analog conversion of individual tone data specifying an amount of exposure for each said element;
   means for respectively generating control signals specifying a light emission time period of each element based on correction data for unifying light output characteristics of each said element;
   means for respectively outputting drive current for each element by effectualizing the drive signals of each said element for a time period specified by the control signal of each said element;
   means for detecting an amount of physical influence on photosensitivity characteristics of the photosensitive member; and
   means for setting an amplitude of said drive current in accordance with an amount of physical influence detected by said means for detecting.

2. An apparatus as claimed in claim 1, wherein said means for detecting includes a sensor for measuring temperature.

3. An apparatus for forming an electrostatic latent image on a photosensitive member by exposing a surface thereof, said apparatus comprising:
   a print head having a plurality of optical elements;

a register which fetches individual tone data specifying an amount of exposure for each said element;

a plurality of D/A converters, each converter corresponding to a respective one of said elements, each converter converting a respective one of said individual tone data outputted from said register to analog signals;

a plurality of transistors, each transistor corresponding to a respective one of said elements, each transistor outputting respective analog signals to each element for a time period specified by a control signal of a respective element;

a plurality of amplifiers, each of which is provided between a respective one of said transistors and a respective one of said elements and which amplifies the respective analog signal;

a sensor which detects temperature; and a switch which sets an amplitude of said amplifiers in accordance with a temperature detected by said sensor.

4. An apparatus as claimed in claim 3, wherein the control signal applied to a respective transistor is outputted by comparing a correction data for a respective element with a triangular wave.

5. An apparatus as claimed in claim 4, further comprising:

a memory in which said correction data for each element is stored.

* * * * *